US012811144B2

(12) United States Patent
Yu et al.

(10) Patent No.: US 12,811,144 B2
(45) Date of Patent: Nov. 24, 2026

(54) POSITIVE ELECTRODE MATERIAL AND PREPARATION METHOD AND APPLICATION THEREOF

(71) Applicant: AESC Japan Ltd., Kanagawa (JP)

(72) Inventors: Le Yu, Shanghai (CN); Qian Li, Shanghai (CN); Wenbin Lyu, Shanghai (CN)

(73) Assignee: AESC Japan Ltd., Kanagawa (JP)

( * ) Notice: Subject to any disclaimer, the term of this patent is extended or adjusted under 35 U.S.C. 154(b) by 531 days.

(21) Appl. No.: 18/527,384

(22) Filed: Dec. 4, 2023

(65) Prior Publication Data

US 2025/0158048 A1 May 15, 2025

(30) Foreign Application Priority Data

Nov. 14, 2023 (CN) ......................... 202311514982.1

(51) Int. Cl.
*H01M 4/525* (2010.01)
*H01M 4/02* (2006.01)
*H01M 4/04* (2006.01)
*H01M 4/505* (2010.01)
*H01M 10/0525* (2010.01)
*H01M 10/0562* (2010.01)

(52) U.S. Cl.
CPC ......... *H01M 4/525* (2013.01); *H01M 4/0471* (2013.01); *H01M 4/505* (2013.01); *H01M 10/0525* (2013.01); *H01M 10/0562* (2013.01); *H01M 2004/021* (2013.01); *H01M 2004/028* (2013.01); *H01M 2300/008* (2013.01)

(58) Field of Classification Search
CPC .............................. H01M 4/505; H01M 4/525
See application file for complete search history.

(56) References Cited

FOREIGN PATENT DOCUMENTS

| | | | |
|---|---|---|---|
| CN | 115050962 | 9/2022 | |
| CN | 115050962 A * | 9/2022 | ............ H01M 4/625 |
| JP | 2023021918 | 2/2023 | |

OTHER PUBLICATIONS

"Office Action of Japan Counterpart Application", issued on May 2, 2025, p. 1-p. 2.

(Continued)

*Primary Examiner* — Stephan J Essex
(74) *Attorney, Agent, or Firm* — JCIPRNET

(57) ABSTRACT

The invention provides a positive electrode material and a preparation method and an application thereof. The positive electrode material at least includes: a positive electrode active material; and a coating layer coating the positive electrode active material, the coating layer including a halide solid electrolyte; wherein: the positive electrode active material includes $nLi_2MnO_3\cdot(1-n)LiMn_aCo_bNi_cO_2$, and $0.2\le n\le 0.5$, a+b+c=1; a chemical formula of the halide solid electrolyte is $Li_{2+m}Zr_{1-m}Fe_mCl_{6-x-y}Br_xI_y$, and $0<m\le 0.5$; x=0 to 6, y=0 to 6, $x+y\le 6$. The invention provides a positive electrode material and a preparation method and an application thereof that may improve the interface stability between a positive electrode sheet and a solid electrolyte and improve a stability and a cycle performance of a lithium-ion battery.

11 Claims, 3 Drawing Sheets

(56) References Cited

OTHER PUBLICATIONS

"Final Office Action of Japan Counterpart Application", issued on Jul. 11, 2025, p. 1-p. 3.
Hiram Kwak et al., "New Cost-Effective Halide Solid Electrolytes for All-Solid-State Batteries: Mechanochemically Prepared Fe3+-substituted Li2ZrCI6", Advanced Energy Materials, Jan. 18, 2021, pp. 1-10.
"Search Report of Europe Counterpart Application", issued on May 27, 2024, p. 1-p. 11.

* cited by examiner

POSITIVE ELECTRODE MATERIAL AND PREPARATION METHOD AND APPLICATION THEREOF

CROSS-REFERENCE TO RELATED APPLICATION

This application claims the priority benefit of China application serial no. 202311514982.1, filed on Nov. 14, 2023. The entirety of the above-mentioned patent application is hereby incorporated by reference herein and made a part of this specification.

BACKGROUND OF THE INVENTION

Field of the Invention

The invention relates to the technical field of lithium-ion batteries, in particular to a positive electrode material and a preparation method and an application thereof.

Description of Related Art

With the development of secondary batteries, mainly lithium-ion batteries, lithium-ion batteries have been widely used in portable electronic products and electric vehicles, etc. However, recent frequent safety accidents in new energy vehicles are due to the use of flammable organic solvents as electrolytes in traditional lithium-ion batteries, which pose serious safety risks. This issue may not be completely solved via conventional improvement methods. In comparison, all-solid-state lithium-ion batteries using inorganic solid electrolytes are safer. Among existing inorganic solid electrolytes, sulfide solid electrolytes have good application prospects due to advantages thereof such as high lithium ion conductivity, and low interfacial resistance and Young's modulus. However, the interface instability between the high-voltage positive electrode material and the sulfide solid electrolyte results in worse cycle performance of the positive electrode. This issue may be alleviated by modifying the surface of a high-voltage lithium-rich manganese-based positive electrode material with a stable oxide coating layer, but this requires specialized equipment and high costs.

SUMMARY OF THE INVENTION

The invention provides a positive electrode material and a preparation method and an application thereof. Via the positive electrode material and the preparation method and the application thereof provided by the invention, the cost may be significantly reduced, and the side reaction between the positive electrode material and the sulfide electrolyte under high voltage may be effectively suppressed to improve the interface stability between the electrode and the solid electrolyte, thereby improving the stability and cycle performance of the battery.

In order to solve the above technical issues, the invention is implemented via the following technical solutions.

The invention provides a positive electrode material at least including:

a positive electrode active material; and a coating layer coating the positive electrode active material, the coating layer including a halide solid electrolyte;

wherein: the positive electrode active material includes $nLi_2MnO_3\cdot(1-n)LiMn_aCo_bNi_cO_2$, and $0.2\leq n\leq 0.5$, $a+b+c=1$; a chemical formula of the halide solid electrolyte is $Li_{2+m}Zr_{1-m}Fe_mCl_{6-x-y}Br_xI_y$, and $0<m\leq 0.5$; $x=0$ to 6, $y=0$ to 6, $x+y\leq 6$.

In an embodiment of the invention, a molar ratio of iron atoms at a surface of the positive electrode material measured by an energy dispersive X-ray spectrometer is 0.4% to 7%.

In an embodiment of the invention, a chemical formula of the halide solid electrolyte is $Li_{2.3}Zr_{0.7}Fe_{0.3}Cl_6$.

In an embodiment of the invention, the positive electrode active material is in a spherical shape.

In an embodiment of the invention, a median particle size D50 of the positive electrode active material in the spherical shape is 8 μm to 20 μm.

The invention also provides a preparation method of a positive electrode material at least including the following steps:

mixing corresponding amounts of compounds containing Li, Zr, and Fe elements and grinding and performing a first sintering to obtain a halide solid electrolyte according to a chemical formula of the halide solid electrolyte; and blending and performing a second sintering on the halide solid electrolyte and a positive electrode active material according to a mass ratio to obtain the positive electrode material.

In an embodiment of the invention, the mass ratio of the halide solid electrolyte and the positive electrode active material is (0.2 to 6):(99.9 to 94).

In an embodiment of the invention, blending conditions include: a mixing speed of 100 rpm to 800 rpm, and a mixing time of 1 h to 6 h.

In an embodiment of the invention, a temperature of the second sintering is 950° C. to 1050° C., and a sintering time is 6 h to 18 h.

The invention also provides a lithium-ion battery including the positive electrode material or a positive electrode material obtained by the preparation method.

The invention also provides an electronic equipment including the lithium-ion battery.

Based on the above, the invention provides a positive electrode material and a preparation method and an application thereof to obtain a halide solid-state electrolyte with low cost, high ionic conductivity, and high voltage resistance, thus solving the issue of interface instability between high-voltage lithium-rich manganese-based positive electrode material and sulfide solid-state electrolyte. The halide solid electrolyte has good compatibility with high-voltage lithium-rich manganese-based positive electrode material to enhance the lithium ion conductivity of the positive electrode material and effectively improve ion transmission dynamics, thereby improving the rate performance of the battery. It may effectively suppress the side reaction between the positive electrode material and the sulfide electrolyte under high voltage, improve the interface stability between the electrode and the solid electrolyte, thereby improving the stability and cycle performance of the battery. The reversible redox ability of oxygen during the cycle may be improved, thereby inhibiting the dissolution of transition metals and the release of oxygen from the positive electrode, thus improving initial Coulombic efficiency and cycle life.

BRIEF DESCRIPTION OF THE DRAWINGS

In order to more clearly explain the technical solutions in the embodiments of the invention, the following briefly introduces the figures needed in the description of the embodiments. Obviously, the figures in the following description are only some embodiments of the invention. For those of ordinary skill in the art, without inventive-step effort, other figures may be obtained based on these figures.

DESCRIPTION OF THE EMBODIMENTS

Figure 1:
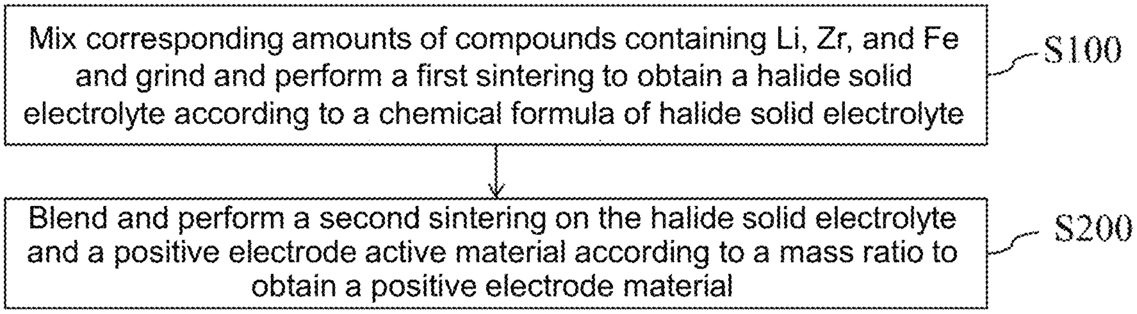
FIG. 1 is a flowchart of a preparation method of a positive electrode material in the invention.

Examples of the invention are described below through specific examples, and those skilled in the art may easily understand other advantages and effects of the invention from the content disclosed in this specification. The invention may also be implemented or applied through other different specific implementation modes, and various modifications or changes may be made to the details in this specification based on different viewpoints and applications without departing from the spirit of the invention.

It will be understood that the invention may be embodied in different forms and should not be construed as limited to the examples set forth herein. Rather, these examples are provided so that this disclosure is thorough and complete and fully conveys the scope of the invention to those skilled in the art. Unless otherwise specified, "%" and "parts" shown in the following examples refer to "mass %" and "parts by mass" respectively.

The technical solution of the invention is further described in detail below with reference to several embodiments and drawings. Obviously, the described embodiments are only some of the embodiments of the invention, rather than all of the embodiments. Based on an embodiment of the invention, all other embodiments obtained by those of ordinary skill in the art without inventive-step effort fall within the scope of the invention.

The invention provides a positive electrode material, including: a positive electrode active material and a coating layer coating the positive electrode active material, wherein the positive electrode active material is a high-voltage positive electrode active material, the high-voltage positive electrode active material is, for example, a lithium-rich manganese-based positive electrode material, and further including $nLi_2MnO_3\cdot(1-n)LiMn_aCo_bNi_cO_2$, etc., and $0.2\leq n\leq 0.5$, a+b+c=1. The coating layer includes a halide solid electrolyte, and the chemical formula of the halide solid electrolyte is, for example, $Li_{2+m}Zr_{1-m}Fe_m Cl_{6-x-y}Br_xI_y$, and $0<m\leq 0.5$; x=0 to 6, y=0 to 6, x+y≤6. In an embodiment of the invention, the halide solid electrolyte is, for example, $Li_{2.3}Zr_{0.7}Fe_{0.3}Cl_6$. In the present application, the halide solid electrolyte does not contain rare earth metals, thus significantly reducing the cost, and the halide solid electrolyte uses iron as a doping element, which while further reducing the cost, the substitution of $Fe^{3+}$ in the crystal lattice may improve the ionic conductivity of the halide solid electrolyte, and the Fe element has a stronger binding ability with the O element in the lithium-rich manganese-based positive electrode material, which is beneficial to improving the reversible redox ability of the O element during the cycle, thereby inhibiting the dissolution of transition metals and oxygen release from the positive electrode, thus improving the initial Coulombic efficiency and cycle life. The halide solid electrolyte is coated on the high-voltage lithium-rich manganese-based positive electrode material to effectively suppress the side reaction between the positive electrode active material and the sulfide electrolyte at high voltage to improve the interface stability between the electrode and the solid electrolyte, thereby improving the stability and cycle performance of the battery.

In an embodiment of the invention, the positive electrode active material is, for example, in a spherical shape, wherein the median particle diameter D50 of the positive electrode active material in the spherical shape is 8 μm to 20 μm. The median particle size of the positive electrode active material is controlled to prevent the processing performance from deteriorating due to a particle size that is too small, and at the same time, to prevent the electrochemical performance from deteriorating due to excessive particle size, and at the same time improve the processing performance and electrochemical performance of the positive electrode active material.

In an embodiment of the invention, in the positive electrode material, the halide solid electrolyte is evenly coated on the surface of the positive electrode active material, and the distribution of iron atoms at the surface of the positive electrode material is measured by an energy dispersive X-ray spectrometer (EDS) to determine the coating amount of the halide solid electrolyte and the uniformity of the coating. In the present embodiment, the molar ratio of iron atoms at the surface of the positive electrode material is, for example, 0.4% to 7%. That is, the halide solid electrolyte has good compatibility with the high-voltage lithium-rich manganese-based positive electrode material $nLi_2MnO_3\cdot(1-n)LiMn_aCo_bNi_cO_2$. At the same time, by coating the surface of the positive electrode active material with a halide solid electrolyte with high ionic conductivity, the ion transport dynamics may be effectively improved, thereby improving the rate performance of the battery.

Referring to FIG. 1, the invention also provides a preparation method of a positive electrode active material. The preparation method includes but is not limited to step S100 to step S200.

Step S100: mixing corresponding amounts of compounds containing Li, Zr, and Fe and grinding and performing a first sintering to obtain a halide solid electrolyte according to a chemical formula of the halide solid electrolyte.

Step S200: blending and performing a second sintering on the halide solid electrolyte and a positive electrode active material according to a mass ratio to obtain a positive electrode material.

Please refer to FIG. 1. In an embodiment of the invention, in step S100, according to the chemical formula of the halide solid electrolyte $Li_{2+a}Zr_{1-a}Fe_aCl_{(6-x-y)}Br_xI_y$, the corresponding molar amounts of compounds containing Li, Zr, and Fe ions are mixed to form a mixture, and the mixture is ground and first sintered to obtain a halide solid electrolyte. In an embodiment of the invention, the chemical formula of the halide solid electrolyte is, for example, $Li_{2.3}Zr_{0.7}Fe_{0.3}Cl_6$, and the selected raw material is, for example, lithium chloride (LiCl), zirconium chloride ($ZrCl_4$), and ferric chloride ($FeCl_3$). In the present embodiment, a variety of raw materials are mixed, for example, by a ball mill, so that the raw materials are mixed and contacted more uniformly, the rotation speed of the ball mill is, for example, 400 rpm to 700 rpm, or 500 rpm, for example, the ball milling mixing time is, for example, 1.5 h to 3 h, or 2 h, and the diameter of the ball milling zirconium beads is, for example, 8 mm to 15 mm, or 10 mm, for example, and the ball-to-material ratio is, for example, (20 to 30):1, or 30:1.

Please refer to FIG. 1. In an embodiment of the invention, in step S100, after the mixture is obtained, for example, the mixture is processed by ball milling, solid-phase sintering, or heating eutectic method, or the mixture is prepared by grinding and sintering. In particular, the grinding speed is, for example, 900 rpm to 1200 rpm, or 1000 rpm, and the grinding time is, for example, 8 h to 15 h, or 10 h. The ground mixture is subjected to a first sintering treatment to obtain a halide solid electrolyte. In particular, the temperature rise rate of sintering is, for example, 4° C./min to 5° C./min, the temperature of the first sintering is, for example, 250° C. to 350° C., the sintering time is 3 hours to 5 hours, the sintering atmosphere is, for example, an inert gas, and the sintering time is the time after the temperature is raised to the temperature of the first sintering. Via the first sintering process, the crystallinity of the halide solid electrolyte may be enhanced. After the sintering is completed, the halide solid electrolyte is cooled by furnace cooling. In the halide solid electrolyte, in the invention, Fe element is used as a doping element, and the isovalent substitution of $Fe^{3+}$ in the crystal lattice may improve the ionic conductivity of the electrolyte. In an embodiment of the invention, the ionic conductivity of the halide solid electrolyte is ≥1 mS/cm.

Please refer to FIG. 1. In an embodiment of the invention, in step S200, after the halide solid electrolyte is obtained, the halide solid electrolyte and a positive electrode active material are blended according to a mass ratio. In the present embodiment, the mass ratio of the halide solid electrolyte and the positive electrode active material is (0.2 to 6):(99.99 to 94), or for example is 0.8:99.8, 1:99, 2:98, 3:97, 4:96, or 5:95, etc. During the blending process, the rotation speed of the mixer is, for example, 100 rpm to 800 rpm, the mixing time is, for example, 1 h to 6 h, and the ball-to-material ratio is, for example, 20:1. Then, second sintering is performed on the mixed halide solid electrolyte and positive electrode active material, wherein the temperature rise rate of sintering is, for example, 8° C./min to 10° C./min, the temperature of the second sintering is, for example, 950° C. to 1050° C., the sintering time is, for example, 6 h to 18 h, the sintering atmosphere is, for example, an inert gas, and the sintering time is the time after the temperature is raised to the second sintering temperature. In the present embodiment, the positive electrode active material is, for example, $nLi_2MnO_3\cdot(1-n)LiMn_aCo_bNi_cO_2$, etc., and $0.2 \le n \le 0.5$, $a+b+c=1$, and the positive electrode active material is in a spherical shape. The resulting positive electrode material is tested by energy dispersive X-ray spectroscopy and found that the molar ratio of Fe atoms at the surface is 0.4% to 7%. The second sintering helps the halide solid electrolyte and the lithium-rich manganese-based positive electrode material to form a good ion transmission interface, and at the same time improves the compactness of the halide solid electrolyte, thereby obtaining a high-quality positive electrode material.

The invention also provides a lithium-ion battery, including a positive electrode sheet, a solid electrolyte, and an negative electrode sheet, wherein the solid electrolyte is disposed between the positive electrode sheet and the negative electrode sheet. In particular, the solid electrolyte is obtained, for example, by pressing a fast ion conductor into a tablet, and the pressure is maintained for 3 minutes to 8 minutes under a pressure of 0.8 tons to 1.5 tons. In other embodiments, other preparation methods may also be used to obtain the solid electrolyte. In the present embodiment, the fast ion conductor includes, for example, a sulfide fast ion conductor, and the sulfide fast ion conductor is, for example, $Li_6PS_5Cl$. The positive electrode sheet includes a positive electrode material, a fast ion conductor, and a conductive agent, etc., wherein the positive electrode material is the positive electrode material coated with the halide solid electrolyte, and the fast ion conductor is, for example, the same as the fast ion conductor in the solid electrolyte, or may be different. In the present embodiment, the fast ion conductor in the positive electrode sheet is, for example, $Li_6PS_5Cl$, etc., and the conductive agent is, for example, conductive carbon black (Super P, SP), carbon nanotube (CNT), carbon fiber (VGCF), graphene, silver powder, or aluminum powder, etc. In an embodiment of the invention, the mass ratio of the positive electrode material, the fast ion conductor, and the conductive agent is, for example, (65 to 89):(10 to 30):(1 to 5). The positive electrode material, the fast ion conductor, and the conductive agent are ground in a mortar for 15 minutes to 30 minutes, and then mixed evenly to obtain a composite positive electrode powder. The composite positive electrode powder is pressed on the solid electrolyte, and maintained under a pressure of 0.8 tons to 1.5 tons for 3 minutes to 8 minutes to obtain a positive electrode sheet. The negative electrode sheet is, for example, a metal lithium sheet. The metal lithium sheet is pressed at a side of the solid electrolyte away from the positive electrode sheet and maintained under a pressure of, for example, 0.1 tons to 0.2 tons to obtain an all-solid-state lithium-ion battery. In particular, the assembly process of the all-solid-state lithium-ion battery is completed in a glove box in an argon atmosphere.

Hereinafter, the invention is explained more specifically by referring to examples, and the examples should not be construed as limiting. Appropriate modifications may be made within the scope consistent with the concept of the invention, and they all fall within the technical scope of the invention.

Example 1

$Li_{2.3}Zr_{0.7}Fe_{0.3}Cl_6$ and $0.5Li_2MnO_3\cdot0.5LiMn_{1/3}Co_{1/3}Ni_{1/3}O_2$ were placed into a ball mill for blending according to a mass ratio of 3:97, wherein the mixing speed was 600 rpm, the mixing time was 3 h, and the ball milling ratio was 20:1. The mixed powder was then placed in a muffle furnace for sintering, with a heating rate of 10° C./min, a sintering temperature of 1000° C., a sintering time of 12 h, and the atmosphere being passed through was argon. After sintering, via grinding and sieving, a high-voltage lithium-rich manganese-based positive electrode material coated with a halide solid electrolyte was obtained. Energy dispersive X-ray spectroscopy testing showed that the molar ratio of Fe atoms at the surface of the positive electrode material was 2.8%.

50 mg of $Li_6PS_5Cl$ was taken and placed into a mold, held under 1 ton of pressure for 5 minutes and pressed into a solid electrolyte, and the coated positive electrode material, $Li_6PS_5Cl$, and conductive agent conductive carbon black were weighed in sequence according to a mass ratio of 70:29:1 and added to a mortar and ground by hand for 20 minutes to obtain composite positive electrode powder. Then, 10 mg of the composite positive electrode powder was placed on the solid electrolyte and held under 1 ton of pressure for 5 minutes to form a positive electrode sheet. After removal, the solid electrolyte was turned over and a metal lithium piece was placed at a side of the solid electrolyte relative to the positive electrode sheet. The diameter of the metal lithium piece was 10 mm. The product was pressurized to 0.1 tons and the pressure was maintained to obtain an all-solid-state lithium-ion battery. In particular, the assembly process of the all-solid-state lithium-ion battery was completed in a glove box in an argon atmosphere.

Example 2

The mass ratio of $Li_{2.3}Zr_{0.7}Fe_{0.3}Cl_6$ and $0.5Li_2MnO_3 \cdot 0.5LiMn_{1/3}Co_{1/3}Ni_{1/3}O_2$ was 6:94. The molar ratio of Fe atoms at the surface of the positive electrode material was 6.8%. The other operations were consistent with Example 1.

Example 3

The mass ratio of $Li_{2.3}Zr_{0.7}Fe_{0.3}Cl_6$ and $0.5Li_2MnO_3 \cdot 0.5LiMn_{1/3}Co_{1/3}Ni_{1/3}O_2$ was 0.2:99.8. The molar ratio of Fe atoms at the surface of the positive electrode material was 0.5%. The other operations were consistent with Example 1.

Comparative Example 1

50 mg of $Li_6PS_5Cl$ was taken and placed into a mold, held under 1 ton of pressure for 5 minutes and pressed into a solid electrolyte. The uncoated $0.5Li_2MnO_3 \cdot 0.5LiMn_{1/3}Co_{1/3}Ni_{1/3}O_2$, $Li_6PS_5Cl$, and the conductive agent conductive carbon black were weighed in sequence according to a mass ratio of 70:29:1 and added to a mortar and ground by hand for 20 minutes to obtain composite positive electrode powder. Then, 10 mg of the composite positive electrode powder was placed on the solid electrolyte and held under 1 ton of pressure for 5 minutes to form a positive electrode sheet. After removal, the solid electrolyte was turned over and a metal lithium piece was placed at a side of the solid electrolyte relative to the positive electrode sheet. The diameter of the metal lithium piece was 10 mm. The product was pressurized to 0.1 tons and the pressure was maintained to obtain an all-solid-state lithium-ion battery. In particular, the assembly process of the all-solid-state lithium-ion batteries was completed in a glove box in an argon atmosphere.

Comparative Example 2

The mass ratio of $Li_{2.3}Zr_{0.7}Fe_{0.3}Cl_6$ and $0.5Li_2MnO_3 \cdot 0.5LiMn_{1/3}Co_{1/3}Ni_{1/3}O_2$ was 0.05:99.95. The molar ratio of Fe atoms at the surface of the positive electrode material was 0.1%. The other operations were consistent with Example 1.

Comparative Example 3

The mass ratio of $Li_{2.3}Zr_{0.7}Fe_{0.3}Cl_6$ and $0.5Li_2MnO_3 \cdot 0.5LiMn_{1/3}Co_{1/3}Ni_{1/3}O_2$ was 15:85. The molar ratio of Fe atoms at the surface of the positive electrode material was 10%. The other operations are consistent with Example 1.

In Examples 1 to 3 and Comparative examples 1 to 3 of the invention, different positive electrode materials were used to prepare lithium-ion batteries. In an environment of 25° C., a Land electrochemical workstation was used. The resulting all-solid-state lithium-ion batteries were tested according to the standard method of testing gram capacity and initial Coulombic efficiency, and the voltage range was 2.0 V to 4.8 V, and the test rate was 0.1 C.

TABLE 1

Performance test results of lithium-ion batteries in Examples 1 to 3 and Comparative examples 1 to 3

| Group | Surface Fe atom molar ratio | Gram capacity/mAh/g | Initial Coulomb efficiency |
|---|---|---|---|
| Example 1 | 2.8% | 276.2 | 84% |
| Example 2 | 6.8% | 260.3 | 87% |
| Example 3 | 0.5% | 205.9 | 70% |
| Comparative example 1 | 0% | 98.5 | 32% |
| Comparative example 2 | 0.1% | 98.2 | 32% |
| Comparative example 3 | 10% | 150.2 | 89% |

Figure 2:
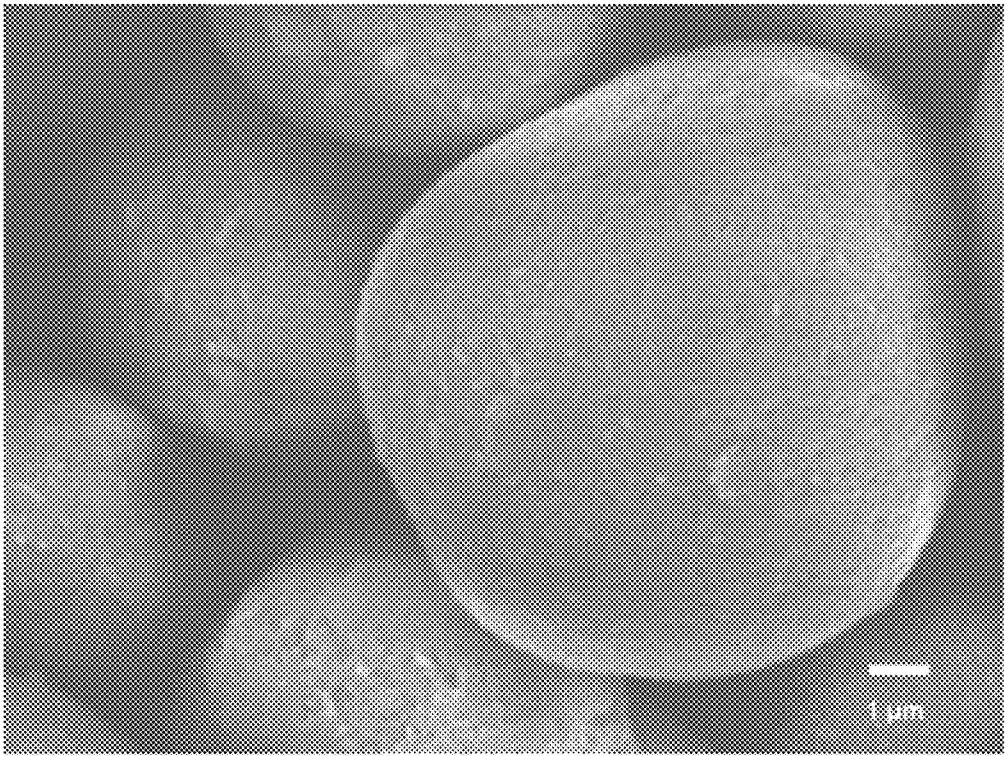
FIG. 2 is a scanning electron microscope image of the positive electrode material in Example 1 of the invention.
Figure 3:
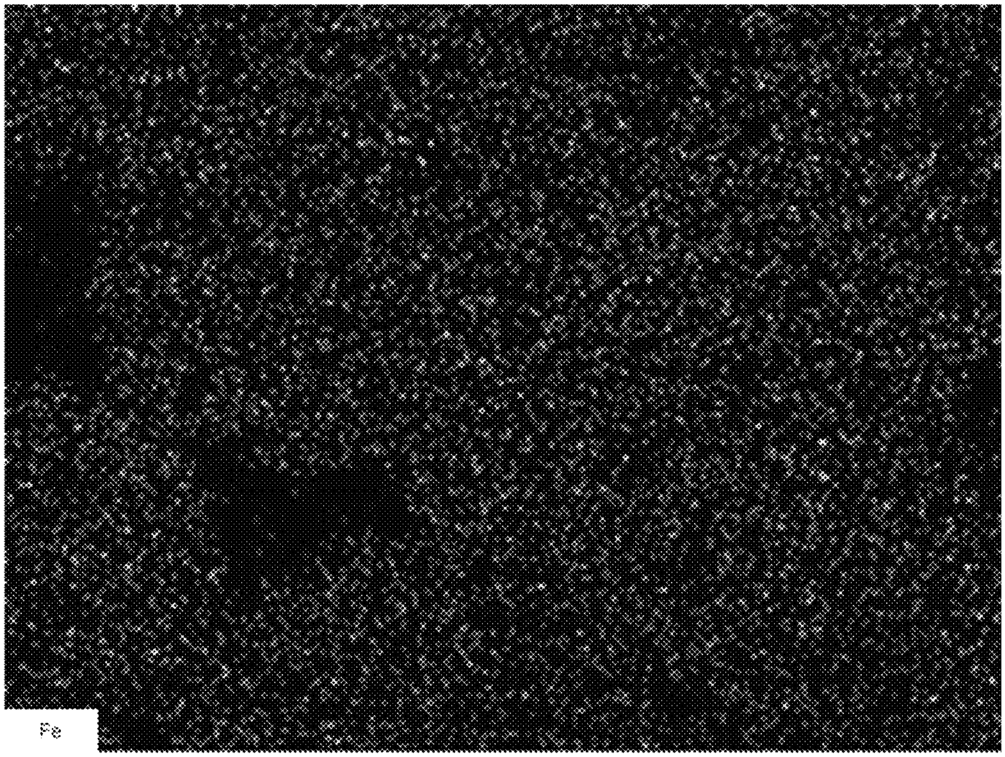
FIG. 3 is an EDS spectrum diagram of the positive electrode material in Example 1 of the invention.
Figure 4:
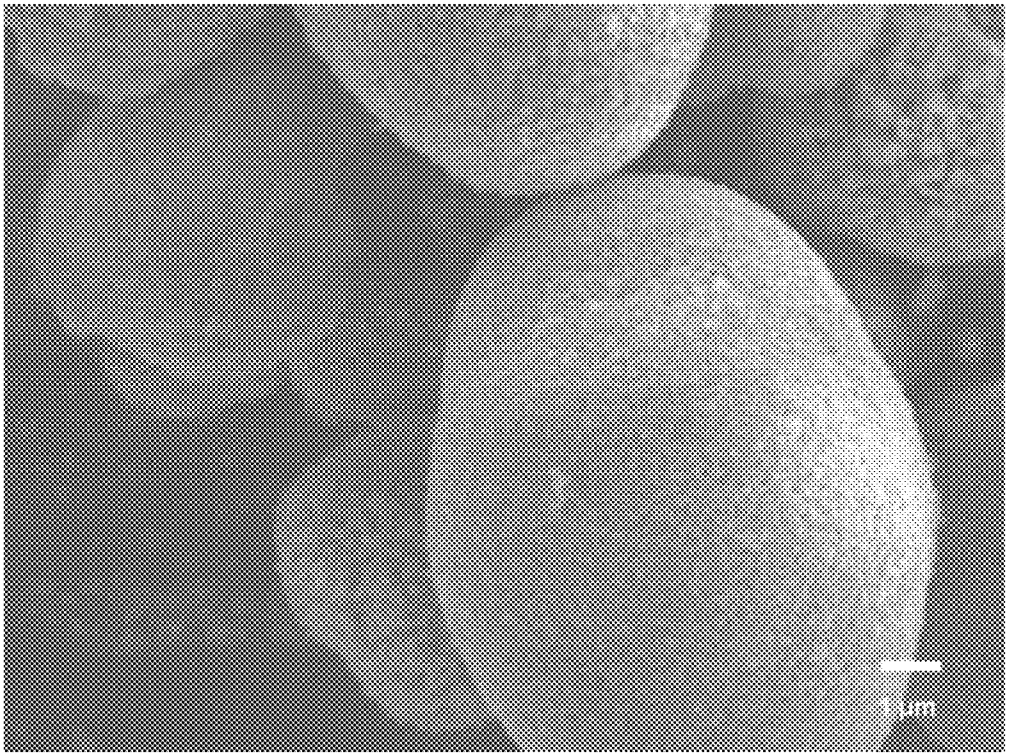
FIG. 4 is a scanning electron microscope image of the positive electrode material in Comparative example 1 of the invention.
Figure 5:
FIG. 5 is an EDS spectrum diagram of the positive electrode material in Comparative example 1 of the invention.

Please refer to FIG. 2 to FIG. 5. The scanning electron microscope (SEM) images and EDS energy spectra of the coated positive electrode material prepared in Example 1 are shown in FIG. 2 and FIG. 3. As may be seen from FIG. 2 and FIG. 3, after being coated with the halide solid electrolyte, a layer of coating material containing Fe element appeared at the surface, and the surface of the material was not damaged. The scanning electron microscope images and EDS energy spectra of the untreated positive electrode active material in Comparative example 1 are shown in FIG. 4 and FIG. 5. As may be seen from FIG. 4 and FIG. 5, the particle surface of the uncoated lithium-rich manganese-based positive electrode material was smooth and did not contain Fe element. Therefore, in the present application, the halide solid electrolyte may be uniformly coated on the particles of the lithium-rich manganese-based positive electrode material without affecting the morphology of the particles of the lithium-rich manganese-based positive electrode material.

Referring to Table 1, comparing Examples 1 to 3 and Comparative example 1, coating with a halide solid electrolyte may increase the gram capacity of the lithium-ion battery and improve the Coulombic efficiency. That is, the halide solid electrolyte had good compatibility with the particles of high-voltage lithium-rich manganese-based positive electrode material, which may effectively improve the ion transmission dynamics, thereby improving the rate performance of the battery. The halide solid electrolyte coated the high-voltage lithium-rich manganese-based positive electrode material to effectively suppress the side reaction between the positive electrode material and the sulfide electrolyte at high voltage and improve the interface stability between the positive electrode and the solid electrolyte, thereby improving the stability and cycle performance of the lithium-ion batteries.

Referring to Table 1, comparing Examples 1 to 3 and Comparative examples 2 to 3, as the molar ratio of Fe atoms at the surface of the positive electrode material was increased or decreased, the coating amount of the halide solid electrolyte was changed simultaneously. When there was too little coating, the small amount of coating layer may not suppress the side reaction between the high-voltage positive electrode active material and the sulfide electrolyte, so the initial Coulombic efficiency and positive electrode gram capacity were lower. When there was too much coating, the halide solid electrolyte coating layer with lower electronic conductivity affected the electronic contact of the positive electrode active material, so the gram capacity was affected. Therefore, by controlling the coating amount of the halide solid electrolyte on the surface of the positive electrode active material, the capacity and cycle performance of the lithium-ion battery may be improved simultaneously.

The invention also provides an electronic equipment. The electronic equipment includes at least one of the lithium-ion batteries, and the lithium-ion battery is used to provide electric energy. In particular, the electronic equipment may be a vehicle, a mobile phone, a portable device, a laptop, a ship, a spacecraft, an electric toy, and a power tool, etc. In an embodiment of the invention, the vehicle is, for example, a new energy vehicle. The new energy vehicle may be a pure electric vehicle, a hybrid vehicle, or an extended-range vehicle, etc. The spacecraft includes an aircraft, a rocket, a space shuttle, and a spacecraft, etc. The electric toy includes a fixed or mobile electric toy, such as a game console, an electric car toy, an electric ship toy, and an electric airplane toy. The power tool includes a metal cutting power tool, a grinding power tool, an assembly power tool, and a railway power tool. Examples include an electric drill, an electric grinder, an electric wrench, an electric screwdriver, an electric hammer, an impact drill, a concrete vibrator, and an electric planer. The electronic equipment includes the lithium-ion battery, and therefore includes the advantages of the lithium-ion battery, which are not elaborated here.

Based on the above, the invention provides a positive electrode material and a preparation method and an application thereof. By coating the positive electrode active material with a halide solid electrolyte, and the halide solid electrolyte includes iron element doping, thus obtaining a halide solid-state electrolyte with low cost, high ionic conductivity, and high voltage resistance, thus solving the issue of interface instability between high-voltage lithium-rich manganese-based positive electrode material and sulfide solid-state electrolyte. The halide solid electrolyte has good compatibility with the high-voltage lithium-rich manganese-based positive electrode material to enhance the lithium ion conductivity of the positive electrode material and effectively improve ion transmission dynamics, thereby improving the rate performance of the battery. It may effectively suppress the side reaction between the positive electrode material and the sulfide electrolyte under high voltage, improve the interface stability between the electrode and the solid electrolyte, thereby improving the stability and cycle performance of the battery. The iron element in the halide solid electrolyte has a stronger binding ability with the oxygen element in the lithium-rich manganese-based positive electrode material, which is beneficial to improving the reversible redox ability of oxygen during the cycle, thereby inhibiting the dissolution of transition metals and oxygen release from the positive electrode, thereby improving the initial Coulombic efficiency and cycle life.

The above description is only the preferred embodiments of the present application and an explanation of the technical principles used. Those skilled in the art should understand that the scope of the invention involved in the present application is not limited to technical solutions formed by specific combinations of the above technical features and at the same time should also cover other technical solutions formed by any combination of the above technical features or their equivalent features without departing from the concept of the invention, such as a technical solution formed by replacing the above features with technical features having similar functions disclosed in the present application (but not limited to).

Except for the technical features described in the specification, the remaining technical features are known to those skilled in the art. In order to highlight the innovative features of the invention, the remaining technical features are not described in detail here.

What is claimed is:

1. A positive electrode material, at least comprising:

a positive electrode active material; and a coating layer coating the positive electrode active material, the coating layer comprising a halide solid electrolyte;

wherein: the positive electrode active material comprises $nLi_2MnO_3\cdot(1-n)LiMn_aCo_bNi_cO_2$, and $0.2 \le n \le 0.5$, $a+b+c=1$; a chemical formula of the halide solid electrolyte is $Li_{2+m}Zr_{1-m}Fe_mCl_{6-x-y}Br_xI_y$, and $0<m\le 0.5$; $x=0$ to 6, $y=0$ to 6, $x+y\le 6$.

2. The positive electrode material of claim 1, wherein a molar ratio of iron atoms at a surface of the positive electrode material measured by an energy dispersive X-ray spectrometer is 0.4% to 7%.

3. The positive electrode material of claim 1, wherein a chemical formula of the halide solid electrolyte is $Li_{2.3}Zr_{0.7}Fe_{0.3}Cl_6$.

4. The positive electrode material of claim 1, wherein the positive electrode active material is in a spherical shape.

5. The positive electrode material of claim 4, wherein a median particle diameter D50 of the positive electrode active material in the spherical shape is 8 μm to 20 μm.

6. A preparation method of a positive electrode material, at least comprising the following steps:

mixing corresponding amounts of compounds containing Li, Zr, and Fe elements and grinding and performing a first sintering to obtain a halide solid electrolyte according to a chemical formula of the halide solid electrolyte; and blending and performing a second sintering on the halide solid electrolyte and a positive electrode active material according to a mass ratio to obtain a positive electrode material.

7. The preparation method of the positive electrode material of claim 6, wherein a mass ratio of the halide solid electrolyte and the positive electrode active material is (0.2 to 6):(99.9 to 94).

8. The preparation method of the positive electrode material of claim 6, wherein conditions of the blending comprise: a mixing speed of 100 rpm to 800 rpm, and a mixing time of 1 h to 6 h.

9. The preparation method of the positive electrode material of claim 6, wherein a temperature of the second sintering is 950° C. to 1050° C., and a sintering time is 6 h to 18 h.

10. A lithium-ion battery, comprising the positive electrode material of claim 1.

11. An electronic equipment, comprising the positive electrode material of claim 1.

* * * * *